A. T. WEAVER.
BALE TIE.
APPLICATION FILED JULY 11, 1913.
1,109,721.
Patented Sept. 8, 1914.
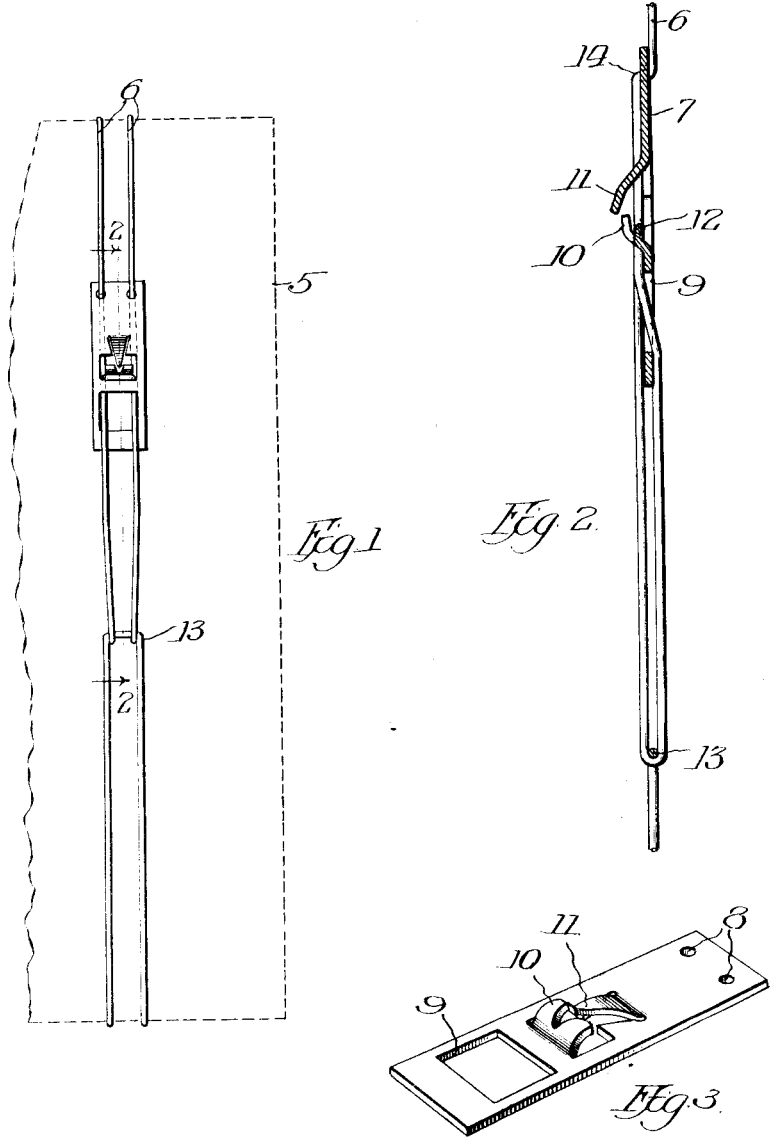

UNITED STATES PATENT OFFICE.

ALBERT T. WEAVER, OF JOLIET, ILLINOIS, ASSIGNOR TO THE AMERICAN STEEL & WIRE COMPANY OF NEW JERSEY, OF HOBOKEN, NEW JERSEY, A CORPORATION OF NEW JERSEY.

BALE-TIE.

1,109,721. Specification of Letters Patent. Patented Sept. 8, 1914.

Application filed July 11, 1913. Serial No. 778,519.

*To all whom it may concern:*

Be it known that I, ALBERT T. WEAVER, a citizen of the United States, residing at Joliet, in the county of Will and State of Illinois, have invented certain new and useful Improvements in Bale-Ties, of which the following is a specification.

My present invention relates in general to ties for packaging bundles, bales and the like, and has more particular reference to bale ties adapted for use in connection with cotton bales.

One of the primary objects of the invention is the provision of a bale tie which shall be light, but at the same time strong and durable, which can be used on a gin bale and also on a compress bale without change or alteration in structure, and which, when applied, will retain the bale under the requisite compression and will present no projecting ends, or rough or sharp edges.

Other objects and advantages of the invention will be readily apparent to those skilled in the art as the same becomes better understood by reference to the accompanying description when considered in connection with the accompanying drawings.

Referring to the drawings: Figure 1 is a fragmentary view of a bale supplied with my improved bale tie; Fig. 2 is a fragmentary sectional view taken substantially on the line 2—2 of Fig. 1; and Fig. 3 is a detailed perspective view looking at the bottom face of my novel buckle.

On the drawings, the bale, which is indicated in dotted lines in Fig. 1, is designated by reference character 5 and one bale tie is shown as embracing the same. The tie, which is designed to provide a double wire band around the bale, comprises in the present instance a loop '6 of endless wire, preferably made from a single length of wire, the ends of which are welded together. The loop is made longer than the perimeter of the largest bale to be tied, so that one end of the loop may be inserted through the other and drawn back to exert the required tension. The loop is secured about the bale under the proper tension by means of a buckle designated generally by the reference character 7. This buckle consists of a metal plate provided adjacent one end with apertures 8, through which the wires of the loop are threaded before their ends are welded together. Adjacent the opposite end of the plate a large preferably rectangular opening 9 is provided and intermediate the ends of the plate the metal is stamped inwardly to provide a hook 10 and the guard 11 projecting toward and disposed adjacent to the hook.

In applying the tie the wire loop is first passed around the bale, and the end 12 of the loop, which projects between the buckle 7 and the bale, is inserted outwardly through the opposite end 13 of the loop, then drawn back and passed inwardly through the opening 9 of the buckle, and then positioned over the hook 10. These operations may be performed while the loop is slack and the loop 12 is prevented from slipping off the hook 10 until the tie has been placed under the proper tension by the overhanging guard 11. The buckle is now slid backwardly along the loop away from the end 13 until the tie has been placed under the requisite tension, the buckle being then held against slippage by the engagement of the edges of the apertures 8 with the wire.

It will be observed that the apertures 8 are very little larger than the wires and when tension is exerted upon the buckle longitudinally thereof the wires are gripped by the edges of the apertures and in most instances are bent, as indicated by reference character 14, so that the slippage of the buckle along the wires under tension exerted longitudinally of the buckle is prevented.

It will be manifest that the tie disclosed is adjustable to bind bales or bundles of various sizes, and when used for binding cotton, the ties are made of sufficient length to be used initially in connection with a gin bale and when this bale has been reduced in size by a compress machine a buckle may be slipped back along the loop a sufficient distance to reduce the size of the tie, so that it will bind the compress bale.

While I have shown and described one preferred embodiment of the invention, it will be understood that various changes in the size, shape, proportion and arrangement of the various parts may be resorted to without departing from the spirit of the invention.

I claim:

1. A bale tie comprising a loop of endless wire, and a buckle slidably mounted on said loop near one end thereof and provided with a hook, the end of the loop projecting beyond said buckle being passed through the opposite end of the loop, doubled back, passed through an aperture in the buckle and engaged with said hook.

2. A bale tie comprising a loop of endless wire, a buckle consisting of a metal plate provided with apertures through which the wires of the loop project, and a tongue intermediate the ends thereof with which the end of the loop passing through the plate is engaged after being inserted through the other end of said loop.

3. A bale tie comprising a double loop of endless wire, and a buckle consisting of a metal plate slidably connected at one end with the loop, provided with an aperture adjacent the other end and having a hook intermediate its ends, one end of the loop being passed through the other end thereof and attached to said hook, whereby the tie may be tightened by sliding the buckle backward on the tie.

4. A bale tie comprising a metal plate provided with wire receiving apertures adjacent one end, a large aperture adjacent the other end and a projecting tongue intermediate its ends, and an endless wire loop having individual wires passed through said first mentioned apertures, inserted through the opposite end of the loop, then threaded through said single enlarged aperture and engaged with said tongue.

5. A bale tie comprising an endless wire loop, and a metal buckle, said buckle consisting of a metal plate provided with a pair of apertures at one end through which the wires of the loop are slidably disposed, a tongue intermediate its ends, and a guard disposed adjacent said tongue to prevent disengagement of an end of the wire loop from said tongue, the end of the loop projecting through said apertures being inserted through the other end of the loop, doubled back and engaged with said tongue.

6. A bale tie comprising an endless wire loop adapted to provide a double wire band around a bale, one end of said loop being passed through the other end and drawn back to exert proper tension on the bale, and a buckle consisting of a metal plate having a projecting tongue engaged with said drawn-back loop end and a guard to prevent disengagement of said loop end from the tongue, said buckle being perforated to receive the wires of said band, the edges of said perforations being adapted to grip the wires and prevent slippage of the buckle under tension exerted longitudinally thereof.

ALBERT T. WEAVER.

Witnesses:
JAMES E. SIME,
S. F. ALLEN.